US006193420B1

United States Patent
Sikorski, Jr.

(10) Patent No.: US 6,193,420 B1
(45) Date of Patent: Feb. 27, 2001

(54) SHIELDED OPTICAL FIBER ADAPTOR

(75) Inventor: Theodore J. Sikorski, Jr., Hamilton Square, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/374,409

(22) Filed: Aug. 13, 1999

(51) Int. Cl.[7] .................................................. G02B 6/36
(52) U.S. Cl. .......................... 385/55; 385/92; 385/134; 385/137; 385/71; 174/67
(58) Field of Search .................. 385/53–55, 92, 385/94, 88, 75, 134–137, 89, 59, 71; 439/367, 373, 567, 572, 573; 361/752, 784, 785; 174/66, 67

(56) References Cited

U.S. PATENT DOCUMENTS

| 5,142,597 | * | 8/1992 | Mulholland et al. | 385/56 |
| 5,600,746 | * | 2/1997 | Arnett | 385/53 |
| 5,708,742 | * | 1/1998 | Beun et al. | 385/53 |
| 5,881,191 | * | 3/1999 | Liberty | 385/53 |
| 5,901,263 | * | 5/1999 | Gaio et al. | 385/92 |
| 5,949,946 | * | 9/1999 | Debortoli et al. | 385/134 |

* cited by examiner

Primary Examiner—Hemang Sanghavi
(74) Attorney, Agent, or Firm—David L. Davis

(57) ABSTRACT

A shielded optical fiber adaptor for mounting in an opening of a conductive faceplate of electronic equipment. The adaptor has an insulative body with a conductive plate imbedded therein. The plate has an aperture within the body which allows passage of light from the optical fiber and extends outwardly of the body to contact the faceplate when the body is retained in the faceplate opening. The largest dimension of the plate aperture is no more than ten percent of the wavelength at the highest operating frequency of the electronic equipment.

6 Claims, 5 Drawing Sheets

SHIELDED OPTICAL FIBER ADAPTOR

BACKGROUND OF THE INVENTION

This invention relates to an adaptor mountable to electronic equipment for receiving an optical fiber connector and, more particularly, to such an adaptor which provides shielding for electromagnetic radiation.

Modern electronic systems equipment, such as for telecommunications purposes, is often required to provide shielding against the leakage of electromagnetic radiation. It is known to provide such shielding by surrounding the electronic components by electrically conductive material. However, there are often gaps which cannot be covered by conductive material. For example, certain systems are connected to optical fibers. Such fibers are typically terminated by a plug connector which plugs into an adaptor mounting module extending through an opening in a conductive faceplate. The adaptor, the fiber and the plug connector are typically constructed of non-conductive material so that the opening in the faceplate is not shielded.

In the telecommunications industry, in recent years the electronic equipment has been designed to operate at higher and higher frequencies. It is known that a gap in a conductive cover of more than ten percent of the wavelength at the highest operating frequency of the electronic equipment is sufficient to allow unwanted electromagnetic radiation to leak therethrough. For equipment operating at ten gigahertz, this translates to a maximum allowable opening of no more than about 3 mm. The faceplate opening for an exemplary optical fiber adaptor of the type described is approximately 13 mm square. Accordingly, a need exists for a shielded optical fiber adaptor which provides a gap of no more than ten percent of the wavelength at the highest operating frequency of the electronic equipment.

SUMMARY OF THE INVENTION

The present invention provides a shielded optical fiber adaptor for mounting to a conductive faceplate of electronic equipment, with the faceplate having an opening for receiving the adaptor therethrough. The adaptor comprises an insulative body having an exterior surface conforming to the faceplate opening, exterior features for releasably retaining the body in the opening, and an interior channel for closely receiving an end of an optical fiber. The adaptor further comprises a conductive plate imbedded in the insulative body. The plate has an aperture in registration with the body interior channel and extends outwardly of the body beyond the conforming surface to contact the faceplate surrounding the faceplate opening when the body is retained in the faceplate opening. The largest dimension of the plate aperture is no more than ten percent of the wavelength at the highest operating frequency of the electronic equipment.

In accordance with an aspect of this invention, the plate aperture is circular.

In accordance with another aspect of this invention, the body includes an outwardly extending flange adjacent the conforming surface and the plate extends beyond the conforming surface immediately adjacent to and in contact with the flange. The adaptor further comprises a conductive compliant gasket surrounding the conforming surface and in contact with the plate on the side of the plate remote from the flange. Accordingly, when the body is retained in the faceplate opening, the gasket is compressed between the plate and the faceplate to maintain good electrical contact between the plate and the faceplate.

In accordance with a further aspect of this invention, that portion of the plate which extends beyond the conforming surface is bent toward the faceplate to insure contact with the faceplate when the body is retained in the faceplate opening.

BRIEF DESCRIPTION OF THE DRAWINGS

The foregoing will be more readily apparent upon reading the following description in conjunction with the drawings in which like elements in different figures thereof are identified by the same reference numeral and wherein.

DETAILED DESCRIPTION

Figure 1A:
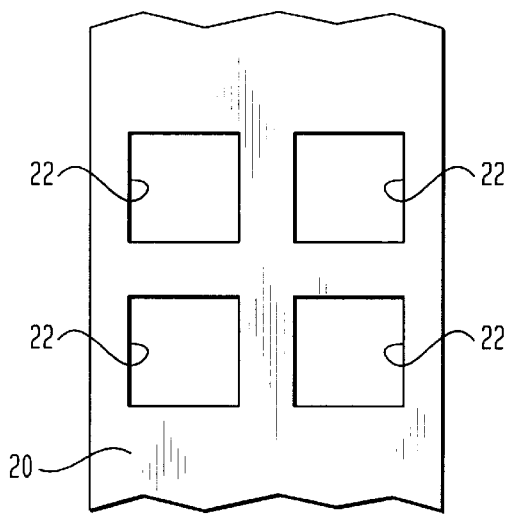
FIG. 1A is a plan view of a portion of a conductive faceplate having openings for holding optical fiber adaptors according to the present invention.
Figure 1B:
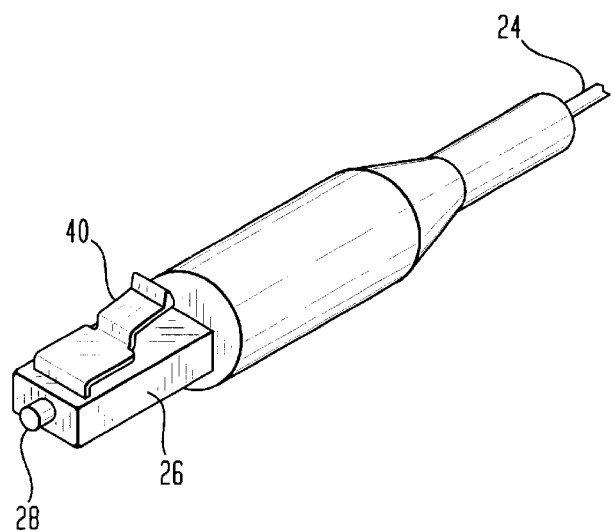
FIG. 1B is a perspective view of an optical fiber plug connector which may be received by an optical fiber adaptor according to the present invention.

Referring now to the drawings, FIG. 1A shows a conductive faceplate 20 having a plurality of openings 22 each for receiving a respective optical fiber adaptor. Illustratively, the optical fiber is terminated by an LC plug connector of the type shown in FIG. 1B. As shown in FIG. 1B, the optical fiber 24 is secured to the connector 26 and has a polished end 28 extending out of the forward end of the connector 26. The connector 26 snaps into an adaptor which has been snapped into one of the openings 22 in the faceplate 20. Illustratively, the connector 26 is of the type manufactured by Lucent Technologies Inc. and each of the openings 22 is of square configuration measuring 13 mm along each side.

Figure 2:
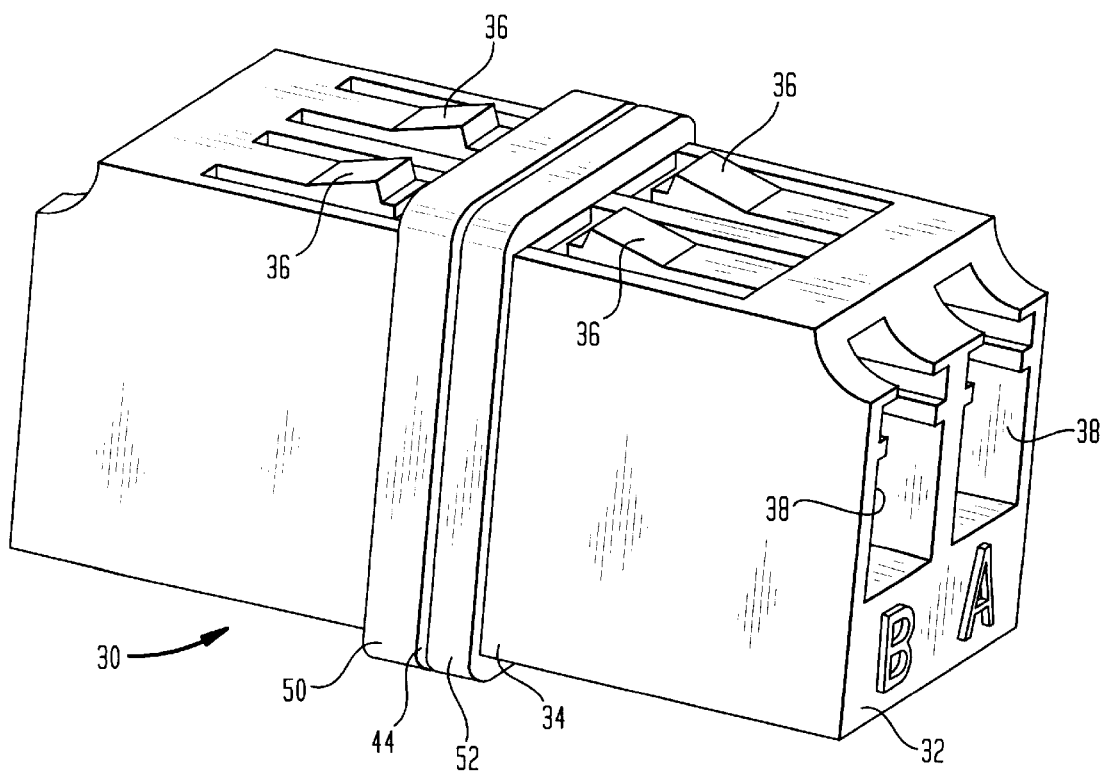
FIG. 2 is a perspective view of a first embodiment of a shielded optical fiber adaptor according to the present invention.

FIG. 2 illustrates an optical fiber adaptor 30 according to the present invention which is designed to snap into one of the openings 22 and to receive a pair of the connectors 26. The adaptor 30 has the same general configuration as the LC snap in duplex adaptor product No. C1000A-2 manufactured by Lucent Technologies Inc. but additionally incorporates a shield according to the present invention. Thus, the adaptor 30 includes an insulative body 32 with an exterior surface 34 which conforms to the opening 22 in the faceplate 20. The body 32 also includes features, such as the resilient latches 36, which are operative to releasably retain the body 32 within an opening 22.

Figure 4:
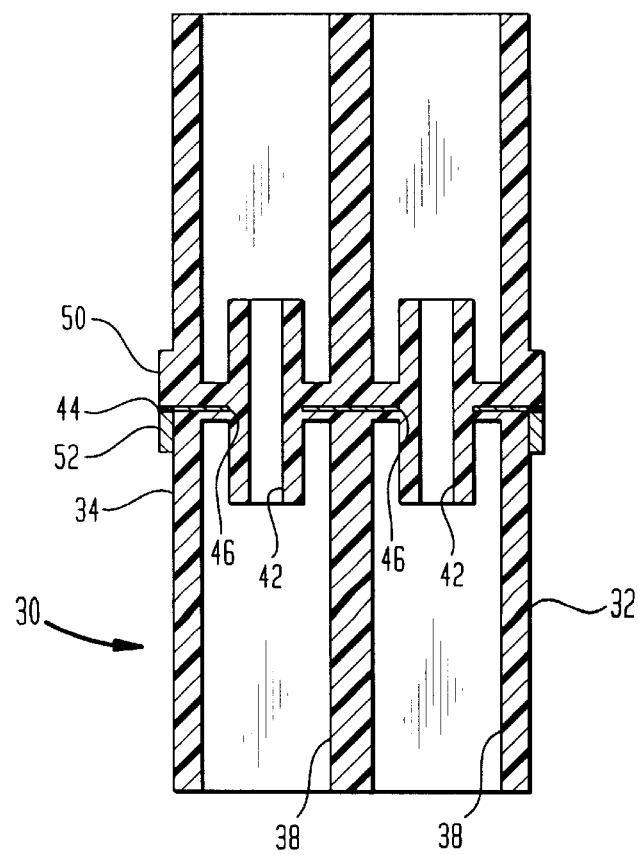
FIG. 4 is a longitudinal cross sectional view of the adaptor shown in FIG. 2.

As illustrated, the adaptor 30 is designed to accept two connectors 26, one in each of the openings 38, although it is understood that the present invention may be applied to adaptors capable of accepting fewer or more than two connectors. In any event, the opening 38 is sized to receive the connector 26 and has features (not shown) for cooperating with the latch 40 of the connector 26 to releasably retain the connector 26. When the connector 26 is seated in the opening 38, the optical fiber end 28 is closely received in the channel 42 (FIG. 4). This allows light communication between that fiber and a fiber installed in the other end of the body 32 and also received in the channel 42, this other fiber being permanently installed in the electronic equipment having the faceplate 20. Since the body 32, the optical fiber 24 and the connector 26 are all formed of non-conductive material (i.e., molded plastic) this would normally provide a gap through which electromagnetic radiation could leak. However, according to the present invention, this gap is sealed by a conductive plate imbedded in the body 32.

Figure 3:
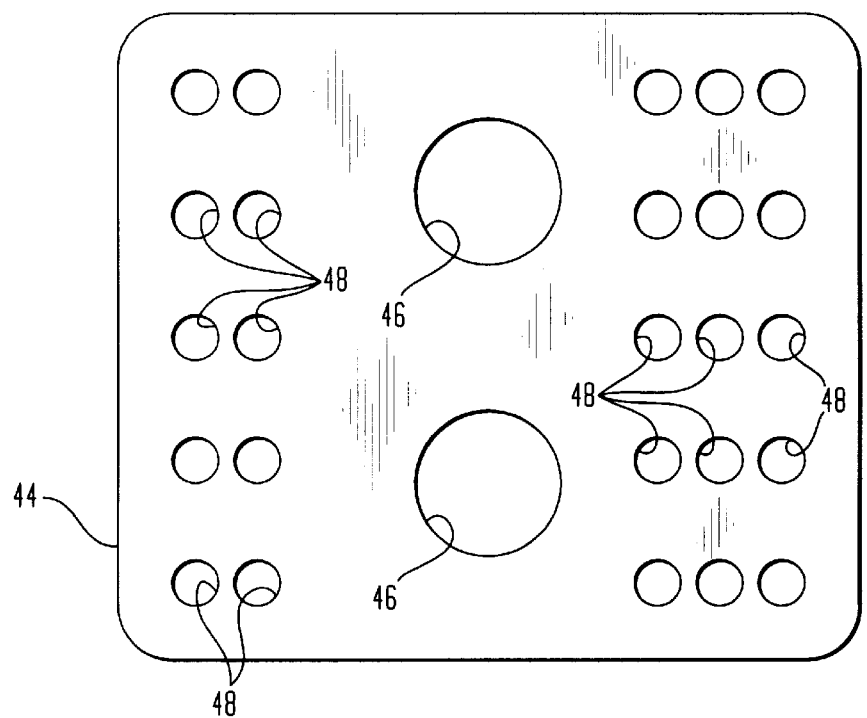
FIG. 3 is a plan view of the shield of the adaptor shown in FIG. 2.

FIG. 3 illustrates a first embodiment of such a plate 44. Illustratively, the plate 44 is a planar metal plate of thickness less than 0.1 mm. The plate 44 is imbedded in the body 32 during the process of molding the body 32. As shown in FIG. 3, the plate 44 includes a pair of apertures 46 which, as shown in FIG. 4, are each in registration with a respective one of the interior channels 42 so that they do not block the channels. Illustratively, the apertures 46 are circular with a diameter no more than ten percent of the wavelength of the highest operating frequency of the electronic equipment. When the electronic equipment operates at ten gigahertz, the apertures 46 may have a diameter of approximately 3 mm. This is larger than the size of the channel 42. In addition to the apertures 46, the plate 44 is formed with a plurality of holes 48 which are for the purpose of allowing the plastic of the body 32 to flow during the molding process. These holes 48 are smaller than the apertures 46 so that they do not take away from the shielding effect of the plate 44.

The plate 44 extends outwardly of the body 32 beyond the conforming surface 34. The body 32 is also formed with an outwardly extending mounting flange 50 adjacent the conforming surface 34. The portion of the plate 44 which extends outwardly of the body 32 abuts one surface of the flange 50. The adaptor 30 further comprises a conductive compliant gasket 52 which surrounds the conforming surface 34 and is in contact with the outwardly extending portion of the plate 44 on the side of the plate 44 remote from the flange 50. Accordingly, when the adaptor 30 is installed in an opening 22 of the faceplate 20, the gasket 52 is compressed between the plate 44 and the faceplate 20 to maintain good electrical contact therebetween.

Figure 5:
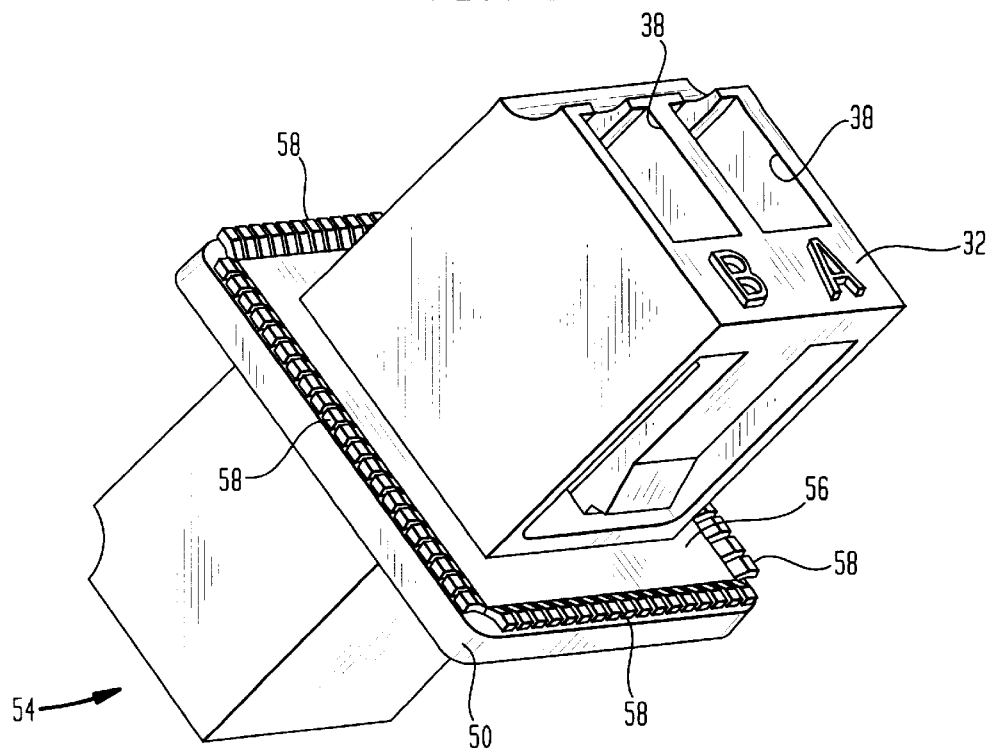
FIG. 5 is a perspective view of a second embodiment of a shielded optical fiber adaptor according to the present invention.
Figure 6:
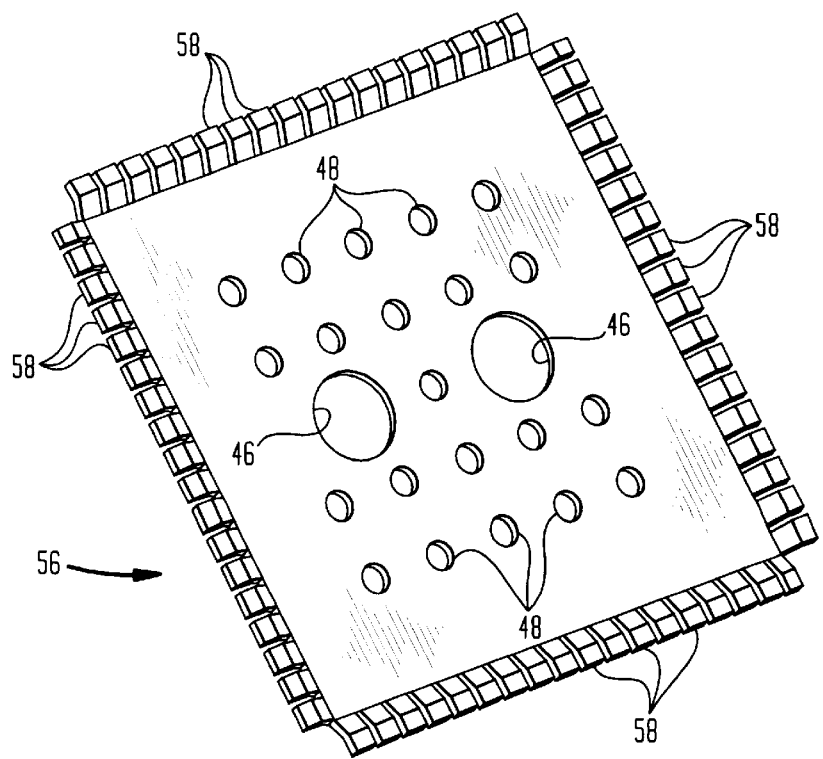
FIG. 6 is perspective view of the shield of the adaptor shown in FIG. 5.
Figure 7:
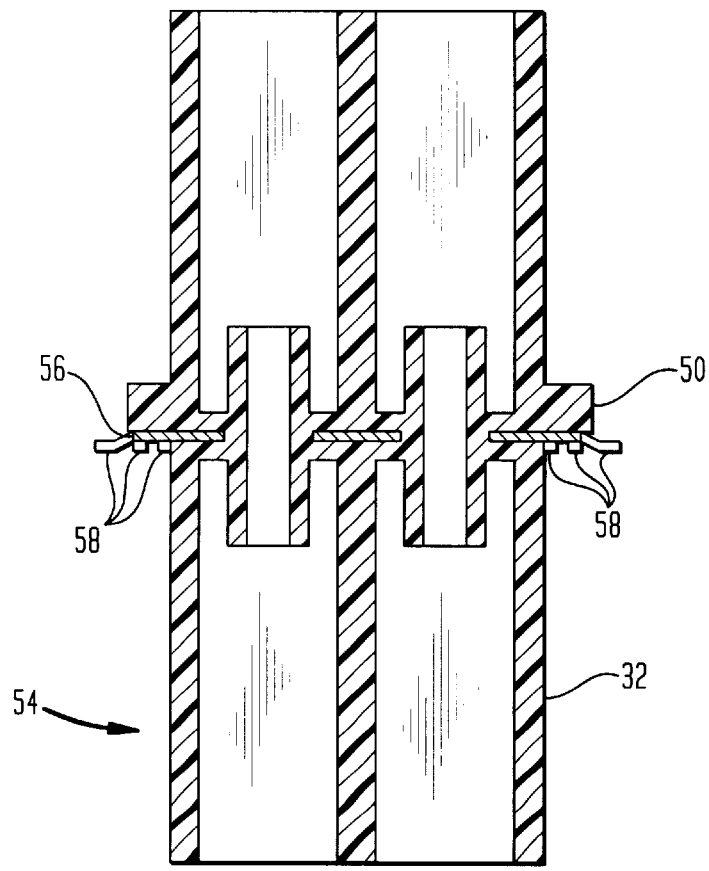
FIG. 7 a longitudinal cross sectional view of the adaptor shown in FIG. 5.

FIGS. 5–7 illustrate a second embodiment of an adaptor constructed in accordance with the principles of this invention. As shown, the adaptor 54 has the same body 32 as the adaptor 30, but the plate 56 is preformed in the area extending outwardly of the body 32 similar to a spring washer to increase the reliability of the contact between the plate 56 and the faceplate 20, while allowing elimination of the gasket 52. Illustratively, the plate 56 is formed with crenelations 58 extending along its periphery.

Figure 8:
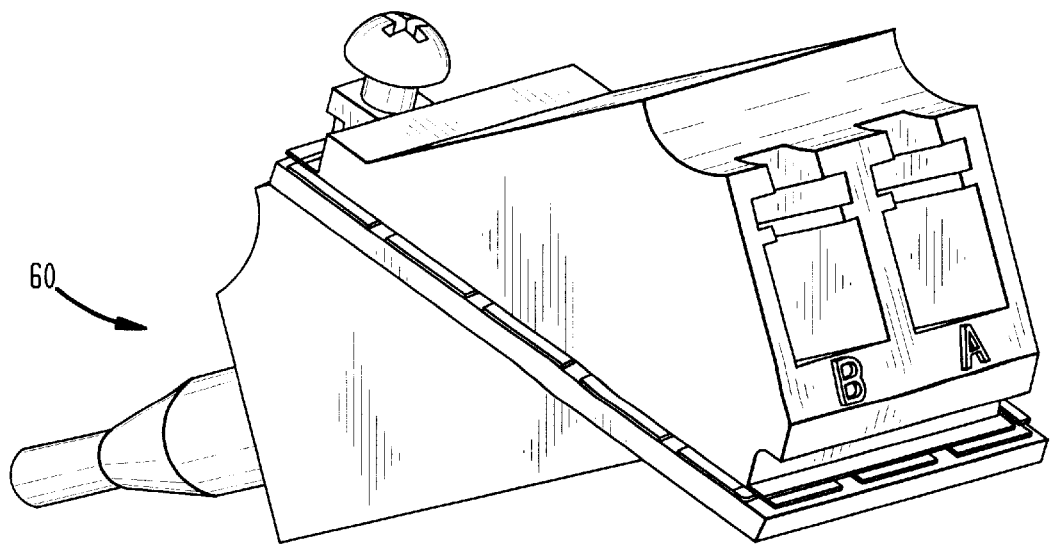
FIG. 8 a perspective view of a third embodiment of a shielded optical fiber adaptor according to the present invention.
Figure 9:
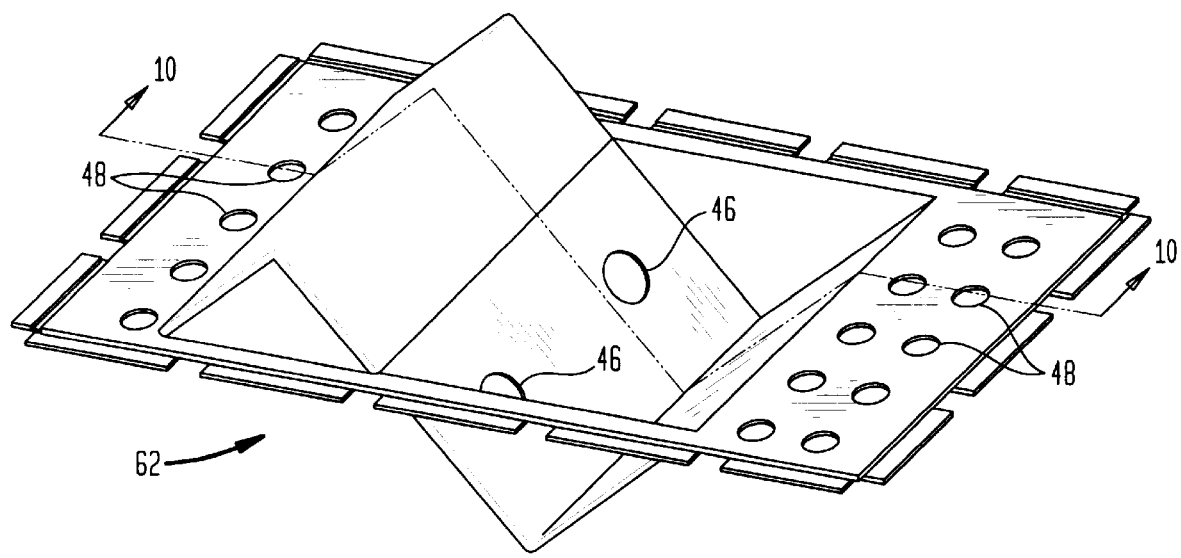
FIG. 9 is a perspective view of the shield of the adaptor shown in FIG. 8.
Figure 10:
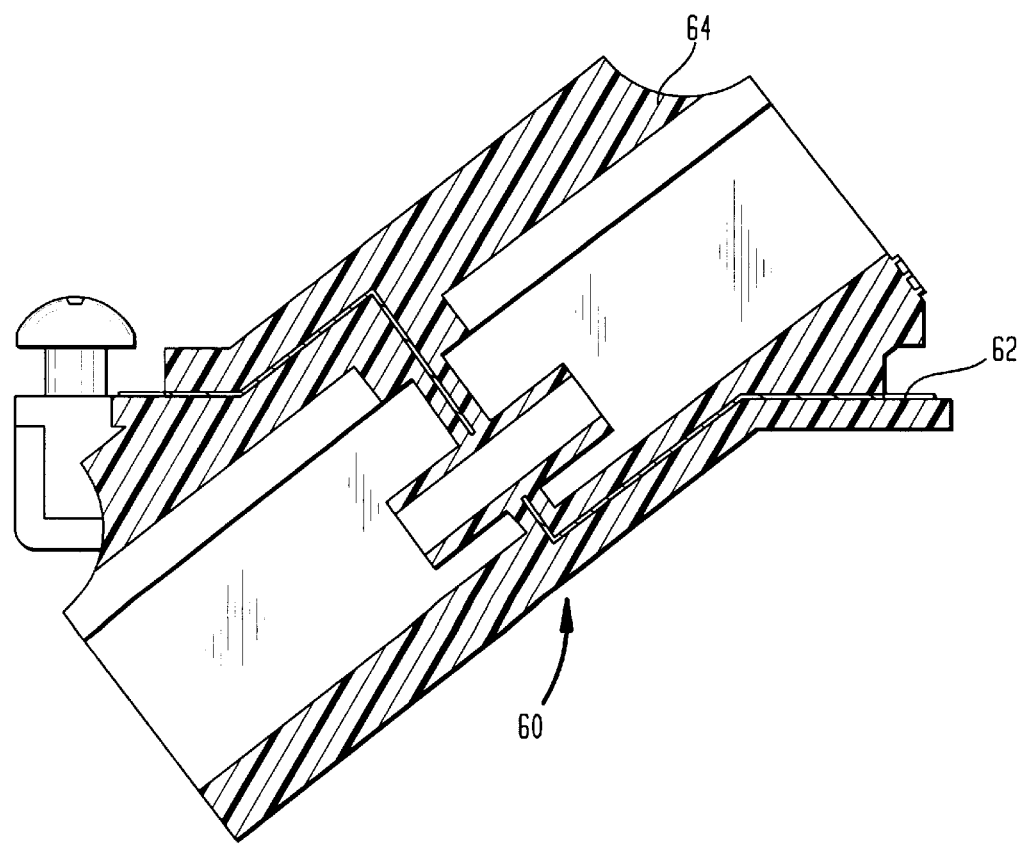
FIG. 10 is a longitudinal cross sectional view of the adaptor shown in FIG. 8.

FIGS. 8–10 show another embodiment of an adaptor 60 which is mounted at an angle less than 90° to the faceplate 20. In the embodiment shown in FIGS. 8–10, the plate 62 has a central section bent and folded to follow the plastic of the body 64, as best shown in FIG. 10.

While the illustrative plates have been disclosed as being formed of sheet material, they may also be constructed of expanded metal or screen. The screen may be metal or other shielding material such as carbon.

Accordingly, there have been disclosed optical fiber adaptors which provide shielding for electromagnetic radiation. While illustrative embodiments of the present invention have been disclosed herein, it will be appreciated that various adaptations and modifications to the disclosed embodiments are possible and it is intended that this invention be limited only by the scope of the appended claims.

What is claimed is:

1. A shielded optical fiber adaptor for mounting to a conductive faceplate of electronic equipment, the faceplate having an opening for receiving the adaptor therethrough, the adaptor comprising:

an insulative body having:
an exterior surface conforming to the faceplate opening;
exterior features for releasably retaining the body in the opening; and
an interior channel for closely receiving an end of an optical fiber; and
a conductive plate imbedded in the insulative body and having an aperture in registration with the body interior channel, wherein the plate extends outwardly of the body beyond the conforming surface to contact the faceplate surrounding the faceplate opening when the body is retained in the faceplate opening;
wherein the largest dimension of the plate aperture is no more than ten percent (10%) of the wavelength at the highest operating frequency of the electronic equipment.

2. The adaptor according to claim 1 wherein the plate aperture is circular.

3. The adaptor according to claim 1 wherein the body includes an outwardly extending flange adjacent the conforming surface and the plate extends beyond the conforming surface immediately adjacent to and in contact with the flange, the adaptor further comprising:
a conductive compliant gasket surrounding the conforming surface and in contact with the plate on the side of the plate remote from the flange;
whereby when the body is retained in the faceplate opening the gasket is compressed between the plate and the faceplate to maintain good electrical contact between the plate and the faceplate.

4. The adaptor according to claim 1 wherein that portion of the plate which extends beyond the conforming surface is bent toward the faceplate to insure contact with the faceplate when the body is retained in the faceplate opening.

5. The adaptor according to claim 4 wherein that portion of the plate which extends beyond the conforming surface is formed with a plurality of crenelations extending along the plate periphery.

6. The adaptor according to claim 1 wherein the body is molded of plastic material and the plate is inserted in the mold during the molding process, the plate being formed with a plurality of holes each smaller than the plate aperture so that molten plastic material can flow through the plurality of holes during the molding process.

* * * * *